United States Patent
Battista

[15] 3,649,347
[45] Mar. 14, 1972

[54] SHAPED STRUCTURES HAVING A SELF-ADHERENT COATING OF A WATER-INSOLUBLE IONIZABLE SALT OF A COLLAGEN

[72] Inventor: Orlando A. Battista, Yardley, Pa.
[73] Assignee: FMC Corporation, Philadelphia, Pa.
[22] Filed: Apr. 27, 1970
[21] Appl. No.: 32,437

Related U.S. Application Data

[63] Continuation of Ser. No. 553,295, May 27, 1966, abandoned, which is a continuation-in-part of Ser. No. 436,371, Mar. 1, 1965, abandoned.

[52] U.S. Cl. ............................117/144, 106/161, 117/34, 117/156, 117/164, 260/123.7
[51] Int. Cl. ............................................D21h 1/34
[58] Field of Search.................106/124, 135, 146, 155, 161; 117/156, 164, 34, 144; 195/6; 162/2, 143, 151; 260/123.7; 99/175; 161/170

[56] References Cited

UNITED STATES PATENTS

| | | | |
|---|---|---|---|
| 2,919,999 | 1/1960 | Reissman et al. | 106/124 X |
| 2,934,447 | 4/1960 | Highberger et al. | 117/164 UX |
| 3,073,702 | 1/1963 | Keil et al. | 99/175 X |
| 3,131,130 | 4/1964 | Oneson | 106/161 X |
| 3,223,551 | 12/1965 | Tu | 117/140 |
| 3,276,448 | 10/1966 | Kronenthal | 117/164 X |
| 3,294,579 | 12/1966 | Tu | 117/164 X |
| 3,293,237 | 12/1966 | Wiegand | 260/123.7 |
| 3,294,581 | 12/1966 | Hervey | 117/164 X |
| 3,362,849 | 1/1968 | Tu | 117/164 X |
| 3,374,103 | 3/1968 | Barkin | 106/161 |

*Primary Examiner*—William D. Martin
*Assistant Examiner*—M. R. Lusignan
*Attorney*—Thomas R. O'Malley, George F. Mueller and Robert G. Hoffmann

[57] ABSTRACT

Structures having a self-adherent coating of a water-insoluble, ionizable salt of collagen deposited thereon from an aqueous dispersion of the salt. The base material may be a solid mineral or organic shaped structure and includes, for example, mineral and organic fibers and fibrous and nonfibrous sheets and films.

8 Claims, No Drawings

SHAPED STRUCTURES HAVING A SELF-ADHERENT COATING OF A WATER-INSOLUBLE IONIZABLE SALT OF A COLLAGEN

This invention relates to coatings for a wide variety of bases and to the resulting coated structures and is directed particularly to such coatings that are derived from a water-insoluble, microcrystalline colloidal form of collagen such as that disclosed in application Ser. No. 436,371, filed Mar. 1, 1965, now abandoned, of which copending application Serial No. 553,295, filed May 27, 1966 is a continuation-in-part. This application is a continuation of copending application Ser. No. 553,295, now abandoned.

Essentially, the invention contemplates a structure or base material having on at least one surface thereof an adherent coating or deposit of a water-insoluble, microcrystalline colloidal form of collagen. The invention is based upon the discovery that the water-insoluble, microcrystalline colloidal form of collagen produces self-adherent continuous coatings on base materials from stable dispersions or suspensions of this form of collagen in a suitable liquid medium upon application of a dispersion to the surface of the base material or structure and upon evaporation or volatilization of the liquid. This form of collagen, because it is water-insoluble even at a pH of 3-4, produces coatings that are resistant to water without further treatment and may be rendered extremely resistant to water on treatment with cross-linking agents.

Collagen is the principal building block of the hides and skins of most mammals, including man, and its principal source is hide substance. It also is the chief constituent of many other parts of mammals, such as tendons, intestinal walls, etc. In addition to its principal use—in the manufacture of leather—collagen is also widely used in the preparation of such materials as glue and gelatin. More recently, much study has been directed to the solubilization of collagen and its reconstruction from solution as fibers for use as sutures and fibrous mats for various purposes.

The elementary basic molecular unit of collagen is tropocollagen, sometimes called procollagen. This unit has been isolated and electron micrographs made, so that its structure is well understood. The macromolecules consist of three polypeptide chains coiled together in a long helix, about ten to fifteen angstrom units in diameter and about three thousand angstrom units (0.3 microns) long. Tropocollagen is insoluble in neutral water, but is soluble in certain salt solutions and in dilute acid solutions having a pH of about 3. Much of the work done in the production of reconstituted collagen products has involved the conversion of fibrous collagen to acid-soluble tropocollagen usually employing relatively severe acid pretreatments whereby the collagen fibers and fibrils are reduced to tropocollagen molecules as above described followed by reprecipitation of the molecularly dispersed tropocollagen into a reconstituted form. A typical example of this procedure is disclosed in U.S. Pat. No. 3,157,524.

The next higher organized state in which collagen has heretofore been known is the collagen fibril, which consists of long, thin strands comprising thousands of individual tropocollagen units; the fibrils may be several hundred to a thousand angstrom units in diameter, and vary in length, generally being tens of microns long. In this form, the collagen is initially water-insoluble, not only at the neutral point but also in acidified water at a pH OF 3. It is these fibrils which associated to form the macroscopic fibers present in natural substances and which fibers comprise many thousands of fibrils bonded together.

The art has long worked with these collagen fibers with the thought of using them for the formation of water-absorbent mats or sponges or porous films which could be used in contact with the human skin. Originally, what was attempted was the breaking down of the fibers of the hide into their individual molecular units by solubilizing them and then reconstituting them into batts or films. This process is extremely difficult and expensive.

The second type of approach is disclosed in U.S. Pat. No. 3,157,524. This patent discloses that porous films or sponges may be formed by freezing an acidified collagen gel comprising substantial amounts of tropocollagen, after which the water is sublimed under high vacuum while maintaining the temperature below the freezing point. The patent points out that such products redissolve in water and attempts to neutralize the acid in the freeze-dried product by aqueous alkaline solutions destroys the desired foamlike texture and produces a structure that losses much of its utility. The patentee overcomes this difficulty by freezing a gel of water-dispersible, acid-treated collagen fibers, immersing the frozen mass in a circulating bath of a water-miscible solvent containing an alkaline agent to neutralize the acid whereby the collagen fibrils are dehydrated and coagulated and the salt formed by the neutralization is removed, and subsequently again drying the resultant collagen mass to form a spongelike film or mat which will resist dissolution in water.

The use of this method for neutralization is both slow and costly, and involves several processing steps which are expensive. Most importantly, the reconstituted collagen has lost its original morphology, and the natural bonds between the tropocollagen units present in the original fibrils are substantially weakened by the solubilization, regeneration and neutralization steps used.

In my application Ser. No. 436,371, filed Mar. 1, 1965, now abandoned, and its continuation-in-part application Ser. No. 586,969, filed Oct. 17, 1966, I have described a new form of microcrystalline collagen. The present application is directed specifically to the utilization of this new form of collagen in the production of structures or shaped bodies having on at least one surface thereof a coating or deposit of water-insoluble, microcrystalline collagen without neutralization of the constituent acid.

In accordance, with this invention, I first produce my new form of collagen, which is a distinctly new physical state intermediate between that of swollen collagen fibers and of the tropocollagen molecules as disclosed and claimed in Ser. No. 14,709, filed Feb. 9, 1970, a continuation of the above-mentioned application Ser. No. 586,969. This new form of collagen is a water-insoluble, ionizable partial salt of collagen having a bound ionizable acid content of from about 50 to about 90 percent of the theoretical stoichiometric bound acid content, being essentially free of tropocollagen and degraded derivatives thereof. That is, this partial salt of collagen has a bound acid content varying from about 0.4 to about 0.7 millimole of acid per gram of collagen. It is further characterized in that when colloidally dispersed in water to form a one-half percent by weight gel wherein at least 10% by weight of the partial salt has a particle size under 1 micron, the gel exhibits a pH of about 3.2±0.2 and exhibits an essentially constant viscosity after about 1 hour for at least 100 hours when stored in a closed container at 5° C. This new physical form of collagen is microcrystalline and colloidal; it consists of bundles of aggregated tropocollagen units which vary in length from that of an individual tropocollagen unit to just under 1 micron, and in diameter from about 25 angstrom units to some hundreds of angstrom units. Compositions comprising various forms of collagen, at least about ten percent by weight of which comprises my new submicron microcrystalline colloidal collagen particles produce viscosity-stable aqueous dispersions and gels at low concentrations, of the order of ½ to 1 percent. The presence of appreciable amounts of soluble tropocollagen and degraded derivatives thereof, such as, for example, gelatin adversely affect the viscosity stability.

When these microcrystalline colloidal collagen dispersions and gels are applied to base materials and the water is allowed to evaporate, films are produced which are notable for their ability to swell in water without disintegrating or dissolving as does gelatin. These films still contain all of the very small amount of acid used in making the colloidal collagen; no neutralization whatsoever is made. This is possible because of the strict control of acid concentration in combination with appropriate mechanical disintegration to produce the microcrystalline, waterinsoluble particles and to preclude true solution, in sharp contrast to products made in accordance with the above patent where the collagen has been solubilized and reprecipitated. In the case of the microcrystalline collagen, the particles are completely undenatured, there has been a minimal disruption of the original lateral bonding forces between the tropocollagen units comprising the original fibrils and many of the original lateral natural bonding forces remain substantially unchanged.

In another aspect of this invention, small amounts of typical collagen cross-linking agents such as alum are incorporated in the dispersions or gels prior to the coating operation, so as to impart substantial wet strength to the films.

The microcrystalline colloidal collagen is prepared from any undenatured collagen in the natural state, either as pieces of original hide, gut, or other high collagen source, but preferably with pieces dried under nondenaturing conditions and chopped up for easier handling. The undenatured collagen is treated under carefully controlled conditions with very dilute acid the pH of which is from about 1.6 to 2.6. Where the source material is wet, the proportion of water present must be taken into consideration in preparing the acid solution to be used in the treatment of the source material. The material is then mechanically disintegrated, in the presence of the dilute acid, until about ten percent or more of the material is reduced to submicron size. It is not essential that all the source material be reduced to submicron size. The product becomes useful when about ten percent has been so reduced, although optimum results are obtained at substantially higher concentrations of the submicron microcrystalline material.

For making microcrystalline colloidal collagen, one essential pretreatment is a thorough soaking of the hide substance or other collagen source material with the appropriate very dilute acid at the required pH.

With hydrochloric acid and a typical vacuum freeze-dried cowhide, it is essential that the pH of the treating solution not exceed about 2.6 to produce the microcrystalline colloidal collagen upon subsequent disintegration. Optimum results are attained with acid solutions having a pH of the order of 2 at 1 percent solids. Treatment with solutions having a pH of less than about 1.6 causes rapid degradation of molecular weight with an attendant buildup of acid-soluble tropocollagen and other degradation products as evidenced by a marked drop in apparent viscosity.

The action of the acid is threefold. First, the acid serves to cause a limited swelling of the fibers. Second, there is a limited hydrolysis of selective peptide linkages within the noncrystalline or amorphous regions of the collagen fibrils so that subsequent mechanical disintegration permits a ready fragmentation of the weakened morphology into microcrystalline particles having dimensions intermediate between those of tropocollagen and collagen fibrils. Third, a portion of the acid reacts with free primary amino groups of the collagen to form what may be termed collagen hydrochloride salt which, of course, is ionized in the presence of water.

After the acid treatment, the hide substance, with the acid homogeneously distributed therethrough, is subjected to mechanical attrition to reduce at least about ten percent of the product to submicron size. In general, the preferred disintegrating equipment subjects the particles of treated collagen to high shear against each other, such as the Waring Blendor and the Cowles Dissolver for low solids concentration, causing disruption and effective reduction in size of the subfibril microcrystalline aggregates. High shear can be imparted in other ways, as by extrusion through small orifices as by the use of a Bauer Refiner and Rietz Extructor particularly in the case of high (above 5 percent) solids concentrations, or other known techniques.

Preferably, the disintegration is continued well beyond the point where ten percent of the product is submicron, until 45 to 50 percent or even much more of this product has be reduced to colloidal size.

Hydrochloric acid has been referred to in the foregoing description and is also used in the examples merely because it is relatively inexpensive and allows ready flexibility and ease of control. Other acids, both inorganic and ionizable organic acids, such as, for example, sulfuric acid, hydrobromic acid, phosphoric acid, cyanoacetic acid, acetic acid, citric acid and formic acid are satisfactory. Sulfuric acid, for example, is satisfactory, but control of the action is difficult. Citric acid may be substituted for hydrochloric acid with about equal results. "Ease of control" has reference to the ability to arrest the swelling and hydrolysis of the collagen fibers at that point whereby the insoluble colloidal material is formed and is retained while preventing the rapid degradation of the material to a soluble product.

Upon completion of the disintegration, the gels produced have a pH of from about 2.6 to 3.8, the specific pH being dependent upon the pH of the treating acid. Preferably, the pH of the gels exhibiting optimum properties is between 3.0 and 3.3. For example, in the preparation of 1 percent gel, one part of finely ground, vacuum freeze-dried cowhide was treated with 100 parts of a hydrochloric acid solution having a pH of 2.25. After a 15-minute treatment in a Waring Blendor, the gel had a pH of 3.25. A 2 percent gel was prepared in like manner and had a pH of 3.3. When one gram samples of films prepared by drying these gels were placed in 100 mls. of distilled water, the partial hydrochloride salt of collagen ionized without a disintegration of the films and the pH of the water was lowered to a pH of 3.1.

The partial salts of collagen contain from about 0.35 millimole about 0.8 millimole of acid per gram of collagen, the specific amount being inversely proportional to the pH of the acid solution used in the initial treatment of the collagen. Dispersions and gels wherein the ionizable partial salt of the microcrystalline colloidal collagen contain from about 0.4 millimole to about 0.7 millimole of the acid per gram of collagen form dispersions and gels having maximum viscosities and the dispersions and gels made with the salts within this range have a substantially constant viscosity over a relatively long period of time. Where the collagen is first treated with an aqueous acidic solution having too high a pH, the amount of swelling is not sufficient to destroy the natural fibrous structure of the collagen and mechanical disintegration does not produce the microcrystalline colloidal collagen particles. This type of material containing less than about 0.35 millimole of acid per gram of collagen will not form the required gels having stable viscosity characteristics and the desired coatings. On the other hand, where the aqueous acid has too low a pH and the collagen salt contains more than about 0.8 millimole of acid per gram of collagen, the amount of swelling and hydrolytic degradation have been sufficient to destroy the microcrystalline collagen particles and, accordingly, water-soluble materials are formed which do not form the required gels having stable viscosity characteristics and the desired coatings.

The dispersions or gels can be made not only in water, but also in water combined with water-miscible organic solvents, and even in a water replacement such as dimethyl sulfoxide, as disclosed in application Ser. No. 499,077, filed Oct. 20, 1965, now U.S. Pat. No. 3,393,080, dated July 16, 1968. Where aqueous dispersions are disclosed and specified in the discussion and in the claims, it is to be understood that these dispersions include not only dispersions in water, but also in combination with appropriate amounts of water-miscible solvents.

For many uses, it is highly desirable to remove as much of the free fatty material as possible present in the microcrystalline collagen acid dispersions prior to use. This removal may be achieved by adding cellulosic fibers in the form of highly bleached Kraft wood pulp or microcrystalline colloidal cellulose to the dispersion with appropriate mixing to distribute uniformly the cellulosic material throughout the dispersion. Subsequent filtration of the dispersions, as by a conventional pressure filtration method utilizing layers of cellulosic fabric, cotton batting and the like mounted between suitable foraminous metal plates, results in a significant removal of the natural fatty materials present in the raw material. Alternative procedures to reduce such fatty materials to minimal levels are to extract the raw undried hides with organic liquids such as acetone, that will dissolve fatty materials, or to force the dispersions through cellulose paper or fabric filters under very high pressures. Such filtration steps furthermore help to remove extraneous small amounts of other impurities such as chips of hair and fleshy tissues that are quite undesirable in the finished products.

The coatings may be applied to all types of normally solid materials, that is, materials that are solid at normal room temperatures, such as, for example, stone, and other mineral substances in the form of fibers and sheets formed from such fibers, masonry, plaster, glass and other ceramic materials, metals, natural and synthetic polymers including natural polymers such as wood, wood and other natural cellulosic fibers and structures produced from such fibers in the form of sheets, paper, molded paper and pulp structures, cork, cotton, ramie, flax and other natural cellulosic fibers; synthetic cellulosic substances such as regenerated cellulose, cellulose esters and cellulose ethers, in the form of fibers, filaments, films and other shaped bodies. Further examples of natural polymers include proteinaceous materials in the form of leathers, fibers, films, animal hair, gelatin, etc. Other organic polymers include methacrylates, polyesters, polyamides, polyolefins, polyvinyl resins, polycarbonates, polyurethanes, natural and synthetic elastomers and rubbers, etc., in the form of fibers, non-fibrous and fibrous sheets or films and other shaped structures.

The coatings are self-adherent and may serve a very wide variety of purposes depending upon the base to which they are applied. For example, the coating may be protective and because it is a good barrier for oxygen will protect the underlying surface from oxidation, or the coating may be merely decorative, or the coating may serve as a bonding agent as between fibers in a nonwoven web such as paper, or it may serve as a means for laminating structures, or it may serve as a carrier for desired substances such as light-sensitive or photosensitive particles for photographic films or papers, or it may serve to alter the smoothness of the base surface.

When the dispersions of microcrystalline water-insoluble colloidal collagen are used as coatings, they are particularly useful because of the fact that they bind very strongly to many surfaces and produce results which are superior in many cases to the heretofore known coatings for the particular purposes. For example, in combination with cellulose fibers, water-insoluble microcrystalline colloidal collagen when blended with paper fibers will impart to the paper a substantial wet strength which is from 20–25 percent of the dry strength of the paper, and in the presence of the small percentage of a cross-linking agent for the collagen the wet strength of the paper is of the order of 25–40% of the dry strength of the paper.

Where microcrystalline colloidal collagen is to be used as a wet strength additive for paper, it can be prepared in situ. In this instance, the shredded collagen source material such as hide substance is impregnated with the appropriate quantity of acid and the impregnated hide mixed with the paper pulp. The mixture is then subjected to disintegration sufficiently severe so as to break the material up into a product of colloidal particle size. A Bauer Refiner, which is commonly used for the refining of paper pulps, can be utilized for this purpose.

Preferably, however, an aqueous dispersion of microcrystalline colloidal collagen is prepared in advance and is added to the pulp at any stage in its preparation, before the pulp is fed into the beaters or in the refiner or in the stuff box of the papermaking machine. The initial washings can be recycled to recover the material in the white water. It is surprising that the colloidal collagen, which has relatively little wet strength in and of itself, when present in a fibrous batt will impart to the paper a wet strength of the order of 20–25 percent of its dry strength. Apparently, during the mixing, it adheres very strongly to the fibers and subsequently binds them together very tenaciously. After the paper is dried, the collagen is relatively insensitive to water. As indicated, the wet strength can be increased to the order of 25–40 percent of dry strength by adding a small amount of a cross-linking agent to the product.

The water-insoluble, microcrystalline colloidal collagen not only improves the physical properties of water-laid products formed from fiber slurries containing the collagen, but also serves in a manner similar to a dispersing agent. The water-laid products exhibit an extremely uniform distribution of the individual fibers. When amounts as low as one-half percent, based on the weight of the fibers, is added to the paper mill beater, the microcrystalline colloidal collagen serves as a dispersing agent for synthetic fibers, such as, for example, rayon, polyesters and the like as well as natural papermaking fibers. This small proportion of the collagen particles is highly effective to prevent agglomeration of the fibers which is a particularly serious problem in the use of such fibers as rayon in conventional papermaking procedures.

The wet strength of the films is quite low although they will not disintegrate when immersed in water and retained in the water for extended periods of time. Upon immersion in water, water is absorbed and the film swells to some extent and then remains in this swollen condition.

The wet strength may be increased by incorporating in the dispersions or gels cross-linking agents for collagen. These agents may be incorporated in the gel at any time prior to their application to the base. However, it appears that a more homogeneous distribution throughout the product is obtained when these agents are added at the beginning of the attrition stage. Typical cross-linking agents which are satisfactory include the various formaldehyde-base cross-linking agents such as, for example, urea-formaldehyde precondensate and melamine-formaldehyde precondensate, formaldehyde, glyoxal, acetaldehyde, glutaraldehyde, potassium alum, chrome alum, iron alum, basic aluminum acetate, cadmium acetate, copper nitrate, barium hydroxide, water-soluble diisocyanates, etc. The specific cross-linking agent which is utilized will be dependent upon the end use of the products. Obviously, the cross-linking reactions may be accelerated by moderate heating and this moderate heating is also advantageous where the higher concentrations of microcrystalline collagen are used in that the viscosity of the dispersion may be lowered to some extent. In no instance should temperatures greater than about 90° C. be employed.

By means of the cross-linking agents, wet strengths of up to 50% of the dry strengths are obtainable. An additional benefit is provided by the use of certain of the cross-linking agents, namely, an improvement in the heat-resistance of the films. Shrinkage upon heating is substantially improved as is the resistance to discoloration when certain of the cross-linking agents are used.

The microcrystalline colloidal collagen dispersions as described are useful for the production of greaseproof papers. Gels having a concentration as low as 1 percent form a continuous greaseproof film on papers in thicknesses as low as 0.0003 inch, and the coatings have excellent adhesion to the paper, are flexible, strong and durable. They do not crack on handling and consequently are highly useful for that purpose.

The dispersions or gels may also be admixed with conventional coating pigments and loading agents, such as calcium carbonate, to produce coated papers. The coatings exhibit excellent adhesion and give good printing surfaces.

Not only is this form of collagen useful as a coating agent for fibrous sheets, but it forms an excellent intermediate coating for the production of continuous films such as moistureproof cellophane, being exceptionally adherent to the cellophane and accepting moistureproof coatings and films such as nitrocellulose coatings. In this type of application, the microcrystalline collagen coating serves as an anchoring agent.

The coatings can be applied in conventional fashion, using dip coaters, knife coaters, roll coaters, and the like. While they have a very high apparent viscosity, the viscosity can be reduced very rapidly at high shear rates, so that dispersions which appear to be stiff gels can be applied readily in film form. Moreover, the gels can be warmed up as high as 80° C. with stirring to reduce the viscosity, to permit easier application. The coatings of this invention are highly useful because the product is derived from a naturally occurring protein source, has no toxic ingredient added in its manufacture and it presents no problems of toxicity nor will it provoke allergies. It is edible, so that films prepared from it can be used in combination with foodstuffs. Because of the fact that the gels form films at very low solids concentration, the resultant films are relatively inexpensive and therefore economical to use. This is of considerable importance in many applications.

Because they can be prepared in advance and can be made very storage stable by the simple addition of agents which will prevent the growth of bacteria, the microcrystalline colloidal collagen compounds of this invention have marked advantages over many types of materials, particularly wet strength additives, which do not have these advantages.

The invention may be illustrated by the examples which follow wherein the specified parts of ingredients designate parts by weight. The examples are not to be interpreted as limitations of the invention.

EXAMPLE 1

A mixture of 10 parts of ground, freeze-dried technical hide collagen and 1,000 parts of 0.01 N hydrochloric acid solution was blended in a Cowles Hi-Shear Mixer for 15 minutes at 25° C. to produce a stable gel with an apparent viscosity of 42,000 centipoises. To 750 parts of the gel was added 250 parts of isopropanol, and the mixture was blended in a Cowles Mixer for 20 minutes. This dispersion contained 0.75 percent collagen and had a viscosity of 5,600 centipoises. To it was added 1 percent, by weight of the collagen, of a conventional melamine-formaldehyde resin precondensate marketed under the trade name "Aerotex 23 Special."

A layer of this product was spread with a doctor blade to a thickness of about 0.5 mil on 20 lb. stock bond paper. The mix spread smoothly and adhered uniformly as a continuous layer. The coated paper was dried and cured at 70° F. and 50 percent relative humidity against a smooth, flat surface. The paper retained its original shape; no warping was observed.

The coated paper so produced had a glossy surface and exhibited excellent greaseproof properties. A drop of vegetable oil when placed on the surface showed no signs of penetrating the coating after a half hour at room temperature. The coating did not crack upon repeated bending and controlled the absorption and consequent spreading of inks applied to its surface.

EXAMPLE 2

To a mixture of 750 parts of 0.01 N hydrochloric acid, 247 parts of isopropanol, and three parts of 30 percent formaldehyde was added 30 parts of freeze-dried technical hide collagen and the mixture blended in a Cowles Mixer for 15 minutes to produce a stable gel. The temperature of the mixture during the dispersing step was maintained under 30° C.

This gel was sprayed on paper by conventional spraying methods and produced a high-gloss, greaseproof paper.

EXAMPLES 3–10

These samples illustrate the formation of water-laid fibrous products wherein water-insoluble microcrystalline colloidal collagen dispersions were added to the fiber slurries. It is believed that the colloidal collagen in this type of use coats at least a portion of the fibers and subsequently serves as a bonding agent between the fibers. In the preparation of the samples, standard Noble and Wood paper laboratory equipment was utilized. The testing of the papers were in accordance with TAPPI standard procedures.

In the various examples, 360 parts of fibers were beaten at a consistency of about 1 percent in a laboratory paper mill beater (Valley beater) for 6 minutes using a 5 kg. bedplate weight. The bedplate weight was removed and the slurry brushed for about 2 minutes. About 10 parts of alum were then added to the slurry to bring the slurry to a pH of about 5 and brushing was continued for 5 minutes. A 2 percent microcrystalline colloidal collagen dispersion or gel was then added in a quantity sufficient to provide the desired proportion of the microcrystalline collagen based on the weight of the pulp. The microcrystalline collagen was prepared as described above by treating freeze-dried technical hide collagen with hydrochloric acid and subjecting the mixture to the action of a high shear mixture for about 15 minutes at 25° C.

The pH of the slurry was then adjusted if necessary to a pH of about 5 and brushing continued for 5 minutes. Samples of the slurry were then removed to form the usual handsheets. The handsheets were pressed at about 50 pounds per square inch to remove excess water and the sheets dried at a temperature of 250°–275° F. for 10 minutes. In certain of the examples, a melamine-formaldehyde precondensate (Aerotex 23 Special) and an acid reacting catalyst, namely, zinc nitrate was added. In the table which follows, the proportions of the precondensate and zinc nitrate as set forth represent the proportion based upon the weight of the microcrystalline colloidal collagen.

The fiber employed in Examples 3 and 4 was a highly refined wood pulp commonly known as a dissolving pulp as used in the production of rayon.

The fibers of Example 5 were obtained by shredding Kraft wrapping paper.

The fibers of Example 6 consisted of unbleached Kraft pulp.

The fibers used in Examples 7, 8 and 9 consisted of 50 percent by weight bleached Kraft pulp and 50 percent rayon fibers 1¼ inches in length and having a denier of 1.5. In these examples, the Kraft pulp was first beaten in the paper mill beater and the rayon fibers added during the first brushing period.

In Example 10, the fibers consisted of 85 percent by weight of rayon fibers, one-fourth inch in length and of a 1 denier size and 15 percent Vinyon HH fibers one-fourth inch in length. In the example, no beating was effected in the paper mill beater, the entire period merely brushing the fibers and the paper mill beater serving only as a mixing device to thoroughly distribute the fibers in the slurry. No alum was added to the slurry.

The composition of the handsheets and the physical properties are set forth in the following table:

TABLE I

| Example | Fibers | Microcrystalline collagen, percent | Melamine-formaldehyde, percent | $Zn(NO_3)_2$, percent | Wet tensile (p.s.i.) | Dry tensile (p.s.i.) | Dry tear (gms.) | Dry burst (p.s.i.) |
| --- | --- | --- | --- | --- | --- | --- | --- | --- |
| 3 | Dissolving pulp | 5.0 | | | 15 | 40 | 60 | 55 |
| 4 | ...do | 5.0 | 20 | 2 | 12 | 26 | 145 | 35 |
| 5 | Kraft paper | 5.0 | | | 30 | 85 | 130 | 120 |
| 6 | Unbleached kraft pulp | 2.5 | 15 | 1.5 | 8 | 35 | 55 | 46 |
| 7 | 50% bleached kraft pulp, 50% rayon | 7.0 | | | 4 | 15 | 200 | 25 |
| 8 | ...do | 10.0 | | | 7 | 21 | 120 | 29 |
| 9 | ...do | 7.0 | 20 | 2 | 6.5 | 18 | 240 | 32 |
| 10 | 50% Vinyon HH, 50% rayon | 5.0 | | | 7 | 25 | 230 | 100 |

EXAMPLE 11

Rayon fibers having a 1.5 denier and 1.25 inch in length were brushed in a laboratory paper mill beater at a consistency of about 1 percent for about 15 minutes. Handsheets were formed from the resulting slurry. In a similar manner, additional rayon fiber batches were brushed in a paper mill beater and at the end of the brushing period a 2 percent microcrystalline colloidal collagen dispersion was added in amounts sufficient to provide 2.5 percent, 5.0 percent and 10.0 percent collagen based upon the weight of the fibers. Handsheets were formed from these different mixtures. The composition of the samples and their physical properties are set forth in the following table:

TABLE II

| Sample | Microcryst. collagen, percent | Ream weight, lbs. | Dry tensile, p.s.i. | Wet tensile, p.s.i. | Dry tear, gms. | Dry burst, p.s.i. |
|---|---|---|---|---|---|---|
| A | 0 | No measurable strength properties | | | | |
| B | 2.5 | 46 | 3.8 | 0.2 | 183 | 5 |
| C | 5.0 | 47 | 6.2 | 0.2 | 189 | 10 |
| D | 10.0 | 46 | 15.0 | 1.5 | 160 | 48 |

EXAMPLE 12

A mixture of 50/50 Orlon (¼-inch fiber)/rayon (⅛-inch fiber) with 10 percent microcrystalline colloidal collagen was brushed in a laboratory paper mill beater at a 0.2 percent fiber consistency. The microcrystalline colloidal collagen was added as a dispersion as described in Examples 3–10. The slurry, after adjustment of the pH, was processed on a Fourdrinier screen to a 20 lb. basis weight and the water-laid sheet then passed through a bath containing a formaldehyde-based crosslinking agent. The paper was then dried and cured. The product is a satisfactory liner for fabrics and for similar applications where high tear strength properties are desirable.

EXAMPLE 13

A wet film of cellophane was passed through a water dispersion containing 1 percent water-insoluble microcrystalline colloidal collagen and then dried to form a self-adherent collagen coating on the substrate. The microcrystalline colloidal collagen dispersion was prepared as described in Examples 3–10. The amount of collagen on cellophane varies between 0.1 percent and 0.3 percent of the weight of the substrate.

The dry film coated with microcrystalline colloidal collagen was then passed through a conventional waterproofing nitrocellulose lacquer formulation and subsequently dried. The nitrocellulose coating adhered more tenaciously to the collagen coated cellophane than it does to uncoated cellophane.

Microcrystalline colloidal collagen is superior to gelatin as an anchoring agent for cellophane because it has a higher molecular weight, it can be used in amounts of as low as 20 percent of the amount of gelatin and has a better resistance to flow under heat, providing a tougher, more continuous film and bond and a more flexible film as compared to gelatin.

EXAMPLE 14

A coating or layer of a 1 percent dispersion of microcrystalline colloidal collagen, as described in Examples 3–10, was spread with a doctor blade on the surface of a never-dried sheet or wet gel film of cellophane. Another never-dried sheet or wet gel film of cellophane was superimposed on the coating to form a laminated structure and the structure dried between smooth heated platens. The structure was clear and transparent and the two sheets or films were adhered tenaciously together.

A similar clear and transparent laminated cellophane structure was also formed by substituting two sheets of uncoated dried cellophane.

EXAMPLE 15

An 8 percent microcrystalline colloidal collagen gel was prepared by treating ground, freeze-dried technical hide collagen with a mixture consisting of 25 percent isopropanol and 75 percent dilute hydrochloric acid solution and subjecting the mixture to high shear for 15 minutes at 25° C. The gel was subsequently heated to 80° C. and screw-capped ends of a series of bottles dipped into the gel.

The coated bottles were then passed through a forced-air oven. The microcrystalline colloidal collagen dried to form a thin transparent coating that adhered to the bottles, forming a hermetic seal. The seals could be broken by first cutting around the bottle at the base of the cap and then untwisting the caps.

EXAMPLE 16

A gel as described in Example 15 was sprayed on eggs, apples, carrots, tomatoes and cucumbers. Upon drying, a thin coating of microcrystalline colloidial collagen formed a protective envelope around the foodstuffs. The coating could be removed before consumption of the food by placing the coated object in warm water and brushing. Microcrystalline colloidal collagen is, however, edible and does not have to be removed. In the case of carrots, the coating serves as a barrier to oxygen and the natural carotene color is retained over long storage periods. The coating of microcrystalline colloidal collagen gave the eggs additional strength and reduced the breakage during shipping and handling. The coatings also reduce the amount of moisture loss during storage.

EXAMPLE 17

A silver plated teaspooon was dipped in a 1 percent dispersion of microcrystalline colloidal collagen and air dried. The coated spoon and an uncoated spoon were placed in a hydrogen sulfide atmosphere. The uncoated spoon began to show a darkening after about 5 minutes while the coated spoon showed no darkening for 20 minutes.

EXAMPLE 18

Twenty grams of chopped-up cowhide, free of water by freeze-drying was placed in 1,980 ml. of a hydrochloric acid solution having a pH of 2 and treated at 25°–30° C. in a Cowles Dissolver, Model IVG, for 15 minutes at 5,400 r.p.m. using a 4-inch pick blade. At the end of the attrition, the 1% gel of microcrystalline colloidal collagen was spread in a freeze-drying tray to form a layer one-eighth thick, and freeze-dried overnight (−40° to −50° C., vacuum five microns, heating cycle not exceeding 30° C. with condensation of sublimed water at 60° C.). The resultant product was a ⅛-inch mat which absorbed 65 times its own weight of water. The tensile strength of a dry test strip 1 inch in width was 3½ pounds, and the wet strength of a like test strip was quite low, but measurable The product did not disintegrate on soaking in water.

A dried, shredded collagen hydrochloride, or amine salt, such as shredded, freeze-dried mat as described was attrited in water to form a gel containing 1 percent microcrystalline colloidal collagen. One face of a ½-inch mat was coated with the gel and another placed in contact with the coated surface of the first mat. Upon drying of the laminated structure, the mats could not be separated without tearing of the mat portions. This laminated structure exhibits a moisture vapor transmission of that of the film. The amounts of vapor transmission may be varied by the thickness of the coating or film and may be reduced by incorporation of a cross-linking agent in the coating gel.

In preparing photographic films, plates and papers, the photosensitive material is dispersed in gelatin and the gelatin applied to the desired base. In another aspect of this invention, microcrystalline colloidal collagen may replace a part or all of the gelatin in these photographic emulsions. It has been discovered that approximately one part of microcrystalline colloidal collagen is equivalent to 10 parts of photographic gelatin. It is obvious from this discovery that appreciably thinner coatings may be formed with a resulting improved definition of the photographic image.

Unlike gelatin, which is a degradation product of tropocollagen, tropocollagen is insoluble in neutral water, but is soluble in certain salt solutions, and in dilute acid at about pH 3. The microcrystalline colloidal collagen coatings of this invention are insoluble in water and also insoluble in dilute acid solutions having a pH as low as 3 but will imbibe water to form highly viscous gels which can be combined with the conventional ingredients of photographic emulsions to produce photographic films and papers superior to those made from gelatin.

It is not essential that the microcrystalline colloidal collagen be prepared in advance of processing. The product can be prepared in situ in the process of making the photographic emulsion.

Photographic emulsions conventionally contain small quantities of materials such as alum, which is a cross-linking agent for the gelatin. These materials can likewise be used in making the emulsions using microcrystalline colloidal collagen to replace all or part of the gelatin. The cross-linked material is somewhat less sensitive to water than the non-cross-linked material. As with all forms of collagen, any of the standard cross-linking agents can be used. The silver halide acts to some extent as a cross-linker. In addition, such materials as aldehydes, melamine-formaldehyde condensate, water-soluble diisocyanates, and long chain fatty acids are also satisfactory cross-linking agents.

Representative examples illustrating photographic emulsion coatings contemplated by this invention are as follows:

EXAMPLE 19

Partial replacement of gelatin—20 grams of potassium bromide and 20 grams of citric acid were dissolved in 90 grams of water and 7½ grams of photographic gelatin was soaked in the salt solution until softened. The mixture was then heated to 50° C. to dissolve the gelatin and subsequently cooled to 30° C.

Twenty five grams of photographic grade silver nitrate (free of copper, mercury and organic dirt) was dissolved in 175 grams of water at 30° C. and just enough ammonium hydroxide (20 ml. added to redissolve the silver oxide.

The silver nitrate solution was added to the potassium bromide solution at 30° C.; the mixture was digested for 10 minutes with rapid stirring and then poured into a solution of 7½ grams of gelatin in 30 grams of water. The temperature of the mixture was raised to 50° C. and digested for 10 minutes. It was then poured into an enameled tray surrounded by ice to set the emulsion. The gel was shredded, placed in a clean cloth bag, and placed in cold running water (temperature 15° C.) for at least 1 hour. The washed gel was melted at 40° C. and 100 ml. of 1.5 percent microcrystalline colloidal collagen dispersion was added at 40° C., followed by 28 ml. ethanol and 1 ml. of 10 percent chrome alum solution. The microcrystalline colloidal collagen had been prepared from ground, predried cowhide which had been ether extracted to remove lipids. The collagen dispersions was prepared by attriting the collagen in a citric acid solution in a Waring Blendor for 15 minutes.

A standard photographic gelatin formulation was prepared in a like manner, but differed from the above formulation in that in lieu of the addition of the microcrystalline colloidal dispersion, a solution of 23 grams of gelatin in 80 grams of water was added to the washed gel.

The composition of the emulsions was as follows:

|  |  | Standard |
| --- | --- | --- |
| Gelatin (photographic grade) | 15 g. | 38 g. |
| Microcrystalline collagen | 1.5 g. | — |
| Water | 395 g. | 375 g. |
| Potassium bromide | 20 g. | 20 g. |
| Silver nitrate | 25 g. | 25 g. |
| Citric acid | 20 g. | 20 g. |
| Ethanol | 28 ml. | 28 ml. |
| Chrome alum (10% Sol. in water) | 1 ml. | 1 ml. |
| Conc. ammonia (Lab. reagent) | approx. 20 ml. | approx. 20 ml. |

It should be noted that 1.5 grams of the microcrystalline colloidal collagen and 20 grams of water was the equivalent of 23 grams of photographic gelatin in the above formulation.

The finished emulsions were applied to heavy paper and dried to form photographic print paper. On comparison of the papers made in accordance with this invention against the standard, it was found that the emulsion layer utilizing the microcrystalline colloidal collagen was substantially thinner than that of the control. The film was tougher, more flexible, and had better abrasion resistance. Comparison of prints made by projection printing of the identical negative followed by conventional development techniques showed sharper definition and more faithful reproduction of the negative than the standard.

In those instances where all of the photographic gelatin is to be replaced by microcrystalline colloidal collagen, it has been found that the colloidal collagen gel added to the potassium bromide-citric acid mixture should have an appreciably higher concentration of collagen such as, for example, 8 to 10 percent so as to prevent separation or precipitation of the collagen. An alternative procedure includes the preparation of the microcrystalline colloidal collagen in situ as illustrated by the following example:

EXAMPLE 20

Ground, predried cowhide was ether extracted for 1 hour so as to remove lipids and then dried in a vacuum oven at 35° C. to remove the ether. A mixture comprising 150 ml. of water, 3 grams of citric acid, 15 grams of the treated hide flour and 24 grams of potassium bromide was prepared by first attriting the citric acid, hide flour and water in a Waring Blender for 15 minutes, then adding the potassium bromide, the blending the mixture at high speed for 15 minutes to convert the hide flour to the point where a substantial portion of it had become microcrystalline colloidal collagen. The mixture was filtered through a double thickness of cheesecloth, and returned to the Waring Blender.

A solution of 30 grams of silver nitrate in 50 ml. of water was added slowly to the collagen-bromide dispersion in the Blender at low speed for 5 minutes. Twenty grams of ethanol was added, and the Blender run at high speed for 15 minutes for thorough mixing. The mixture was transferred to a bell jar and evacuated to remove air using a water aspirator. Several sheets of paper were coated with the dispersion by brushing. The remaining portion of the dispersion was poured into an enameled tray, gelled by chilling with ice, shredded, transferred to a bag and washed with water at 18° C. to remove the potassium bromide and the potassium nitrate. After washing, the gel was heated to about 60° C., 20 ml. of ethanol added, then mixed and the resulting dispersion evacuated. Paper was coated with the dispersion and the air dried.

The dispersion exhibited about the same spreading properties as that of the photographic emulsions or dispersions of Example 19. This is unexpected in view of the fact that the dispersion contained only about 10 percent by weight of a film-forming agent, microcrystalline colloidal collagen, as compared to the amount of film-forming agent in the emulsions of Example 19. Although the coating is substantially thinner than that provided by the emulsions of Example 19 although the composition did not contain a cross-linking or hardening agent, the coatings had sufficient toughness and abrasion resistance to resist scratching during processing. Samples were also printed and developed as in Example 19. The finished prints exhibited the same sharp definition, contrast and brightness as exhibited by the prints of Example 19 made in accordance with this invention.

The photographic formulas of Examples 19 and 20 are set forth merely as examples of the utility of the coatings of this invention and it is obvious that the compositions may be varied as desired. Although the examples illustrate the application of the photographic emulsions applied to paper, the coatings are equally applicable to the conventional cellulosic film bases and to glass plates. The sensitivity to light of the different colors may be regulated by the addition of the conventionally used sensitizing dyes. The coatings of this invention are also adapted for use in the production of color films and papers wherein coupler compounds are included in the photographic emulsion or dispersion. The coatings of this invention may also be utilized as an overcoating or protective coating applied after the developing and processing of the negative films, transparencies and prints.

In forming a coating composition for any specific purpose, the composition is formulated to meet the conditions of use of the finished product. For example, a wide variety of cross-linking agents may be included such as, for example, potassium alum, melamine-formaldehyde precondensate, basic aluminum acetate, cadmium acetate, chrome alum, copper nitrate, barium hydroxide, etc. These cross-linking agents improve the strength and toughness of the films and will also improve the heat-resistance of the coating films with respect to both dimensional stability and resistance to discoloration. Coatings containing potassium alum as a cross-linking agent exhibit the highest resistance to discoloration of the enumerated agents.

As stated hereinbefore, during the acid treatment of the collagen, the acid reacts only with the free or accessible amino groups to form a water-insoluble salt of collagen. Some of the amino groups to form a water-insoluble salt of collagen. Some of the amino groups are within the crystallites and are bound within the collagen and thus are not accessible to the treating acid. The term "water-insoluble salt of collagen" is used herein and in the claims to designate this reaction product. The water-insoluble salts of collagen are unique in their characteristic of forming aqueous gels containing one-half percent dispersed salt having a pH between about 3.0 and 3.3, the gels having a substantially stable viscosity for at least 100 hours at 5° C.

Various changes and modifications may be made in practicing the invention without departing from the spirit and scope thereof and, therefore, the invention is not to be limited except as defined in the appended claims.

I claim:

1. As an article of manufacture, a shaped, normally solid body and a self-adherent, dry coating on at least a portion of the body, said coating consisting essentially of a water-insoluble, ionizable, partial salt of collagen in an amount sufficient to render the coating self-adherent, said partial salt of collagen having a bound ionizable acid content of from about 50 percent to about 90 percent of the theoretical stoichiometric bound acid content, being essentially free of tropocollagen and degraded derivatives thereof and being further characterized in that when colloidally dispersed in water to form a one-half percent by weight gel wherein at least 10 percent by weight of the partial salt has a particle size under 1 micron, the gel exhibits a pH of about 3.2±0.2 and exhibits an essentially constant viscosity after about 1 hour for at least 100 hours when stored in a closed container at 5° C.

2. An article of manufacture as defined in claim 1 wherein the water-insoluble, ionizable, partial salt of collagen is a hydrogen chloride salt of collagen.

3. An article of manufacture as defined in claim 1 wherein at least 10 percent by weight of the water-insoluble, ionizable partial salt of collagen consists of bundles of aggregated tropocollagen units, each of the bundles having a minimum diameter of about 25A and having a maximum particle size not exceeding 1 micron.

4. An article of manufacture as defined in claim 1 wherein the coating includes a collagen cross-linking agent.

5. An article of manufacture as defined in claim 1 wherein the shaped body is a fibrous body.

6. An article of manufacture as defined in claim 1 wherein the shaped body is paper.

7. An article of manufacture as defined in claim 1 wherein the shaped body is a nonfibrous film.

8. An article of manufacture as defined in claim 1 wherein the shaped body is a nonfibrous film of cellulosic material.

* * * * *

UNITED STATES PATENT OFFICE
CERTIFICATE OF CORRECTION

Patent No. 3,649,347　　　　　　　　Dated March 14, 1972

Inventor(s) Orlando A. Battista

It is certified that error appears in the above-identified patent and that said Letters Patent are hereby corrected as shown below:

Column 1, line 37 "reconstruction" should read --reconstitution--.

Column 4, line 31 "about" should read --to about--.

Column 12, line 39 "the blending the" should read --and blending the--.

Column 12, line 58 "the" second occurrence should read -- ther

Column 12, line 66 "Example 19" should read --Example 19 and--.

Signed and sealed this 26th day of February 1974.

(SEAL)
Attest:

EDWARD M. FLETCHER, JR.　　　　　　C. MARSHALL DANN
Attesting Officer　　　　　　　　　　Commissioner of Patents